(12) United States Patent
Suzuki

(10) Patent No.: US 6,492,740 B2
(45) Date of Patent: Dec. 10, 2002

(54) ENGINE GENERATOR

(75) Inventor: Misao Suzuki, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/835,997

(22) Filed: Apr. 16, 2001

(65) Prior Publication Data

US 2001/0029733 A1 Oct. 18, 2001

(30) Foreign Application Priority Data

Apr. 14, 2000 (JP) .................................... 2000-113699
Apr. 14, 2000 (JP) .................................... 2000-113700

(51) Int. Cl.[7] .............................................. H02K 5/00
(52) U.S. Cl. ........................................ 290/1 A; 123/2
(58) Field of Search ................................ 290/1 A, 1 B, 290/1 R, 2, 40 R, 46; 322/1; 123/2

(56) References Cited

U.S. PATENT DOCUMENTS

| 3,805,082 | A | * | 4/1974 | Murray ....................... 123/1 R |
| 4,647,835 | A | * | 3/1987 | Fujikawa et al. ........... 290/1 B |
| 4,907,546 | A | * | 3/1990 | Ishii et al. ..................... 123/2 |
| 5,212,952 | A | * | 5/1993 | Yokoyama et al. .......... 290/46 |
| 5,899,174 | A | * | 5/1999 | Anderson et al. ............. 123/2 |
| 6,091,160 | A | * | 7/2000 | Kouchi et al. .............. 290/1 A |
| 6,313,543 | B1 | * | 11/2001 | Frank ............................ 123/2 |

FOREIGN PATENT DOCUMENTS

JP 1136879 2/1999

* cited by examiner

*Primary Examiner*—Nicholas Ponomarenko
(74) *Attorney, Agent, or Firm*—Martin A. Farber

(57) ABSTRACT

An engine generator is provided which improves a sturdiness and rigidity, sound insulation performance, and workability at inspecting of the whole structure, and further simplifies the structure through reducing the number of parts of a housing. An engine, a muffler, and a generator are disposed on a base, and included within the housing which has a side cover integrally formed with the base, a main cover comprising an upper surface and a side wall integrally formed each other, mainly used for an overhaul work, and a door cover mainly used for a daily inspection. A partition plate is vertically mounted between the engine and the muffler. A side plate is also vertically mounted inside an end of the housing. A tank bracket is mounted across between each upper portion of the side plate and the partition plate. The base, partition plate, side plate and tank bracket forms an engine room. The base, partition plate, and housing forms a muffler room. The housing has a double wall structure formed by an outer wall, an inner wall, and a hollow space, and further a triple walls structure formed by the housing and the side plate.

8 Claims, 6 Drawing Sheets

ENGINE GENERATOR

BACKGROUND OF THE INVENTION

1. Field of the Invention

The present invention relates to an engine generator comprising an engine and a generator driven by the engine, in particular, to an engine generator including the engine, the generator, a muffler, or the like within a housing.

2. Description of the Related Prior Art

Conventionally, as an electric power source for use in an out-door condition such as a road repairing work, an out-door shop or an out-door leisure, there has been in use so called an engine generator comprising an engine and a generator driven by the engine, both of which are included in a housing so as to produce an electric power. In fact, such an engine generator is so constructed that a rotor equipped with several pieces of magnets is fixed on a crank shaft in such a manner that the rotor can rotate in the vicinity of a stator equipped with a plurality of coils, thereby generating the electric power.

The Japanese Patent Application Laid-Open No. 11-36879 discloses an engine generator which is provided with countermeasure of sound insulation and thermal insulation. In the system of the above-mentioned publication, the engine and the generator are included within a sound insulation case, six surfaces of which are formed by an under frame, a center cover, a lid member, a front cover, and a rear cover. The sound insulation case is divided into three rooms of front, center and rear ones by two frames of front and rear ones. The rear frame is provided with a through hole, where a duct is mounted passing through the center room and the rear room. Thus, the duct includes the generator, the engine and the muffler, which results in a double sound insulation structure.

Outside the duct of the center room, a fuel tank and intake air devises are arranged. Inside the front room, an electronic equipment is disposed. Furthermore, a pair of right and left reinforcement members are formed across between each upper portion of the front frame and the rear frame. The fuel tank is mounted and fixed between the reinforcement members.

Thus, in the engine generator of the aforementioned publication, the double sound insulation structure is formed by including the generator, the engine, and the muffler, all of which causes working sound, into the duct. In addition, the engine generator disposes high temperature generation equipment, fuel equipment, and electronic equipment therein, separating with each other. In such a way, each equipment is effectively disposed from a viewpoint of countermeasure of sound and thermal insulation in the engine generator, which results in a compact size of the whole device.

However, the aforementioned engine generator has such problems as an inside structure thereof is complicated and the number of parts is increased since the inside of the device is completely divided into three rooms. In addition, the second problem is that an effect of the sound insulation is insufficient since the sound insulation structure including the engine, and the like comprises a simple double structure of the duct made of glass wool and the sound insulation case. Furthermore, since the sound insulation case is constructed by so many parts, i.e. such five parts as a front cover, and others, an outer structure thereof is complicated. Thus, there has been a problem that not only an assembling work at a stage of manufacturing but also a disassembling/reassembling work at a stage of inspection are complicated, and so the number of working steps is increased. Incidentally, since there is need to remove a plurality of covers at a stage of daily inspection also as well as one of an overhaul work, many working steps are essential even when a simple inspection is carried out. Therefore, an improvement of workability thereof has been requested.

SUMMARY OF THE INVENTION

In view of the foregoing, an object of the present invention is to provide an engine generator having an enough sturdiness and rigidity, improving a sound insulation performance thereof, and simplifying a structure through reducing the number of parts so as to improve workability at a stage of inspection.

To achieve the foregoing objects, a first aspect of an engine generator according to the present invention is characterized in that an engine generator having an engine, a generator driven by the engine, a muffler disposed at an exhaust side of the engine on a base, and a housing for including the engine, the generator, and the muffler, comprises a partition plate vertically mounted between the engine and the muffler within the housing, a side plate vertically mounted along an end of the housing, a beam mounted across between an upper portion of the side plate and the partition plate, an engine room for including the engine and the generator, said room being surrounded by the base, the partition plate, the side plate, and the beam, and a muffler room surrounded by the base, the partition plate, and the housing for including the muffler.

According to the present invention, the engine room can be formed by cube type frames which are constructed based on the base, the side wall, the partition plate and the beam member. Therefore, the sound insulation preformance of the engine room can be improved due to an existence of the side plate and the partition plate, while the engine room can be constituted with a tough structure due to an existence of the beam member. Thus, even when the housing is made of synthetic resin, the strength of the engine generator can be ensured, thereby improving the vibration isolation performance and durability thereof.

A second aspect of the engine generator according to the present invention is characterized in that in an engine generator having an engine and a generator driven by the engine on a base, and a housing including an upper surface and four side walls for including the engine and the generator, the housing comprises a side cover for integrally forming the base with two adjacent surfaces of the four side walls, a main cover for integrally forming the upper surface with another surface of the four side walls, and a door cover formed by one remaining surface of all the side walls.

In such a configuration, since the housing of the engine generator comprises three parts having each different function such as an overhaul work and a daily inspection, extra parts can be eliminated, and component cost and the number of manufacturing steps can be reduced. Furthermore, it is sufficient for carrying out an adequate inspection within the device that just a door cover may be removed at a stage of daily inspection, and just a main cover at a stage of an overhaul work, and so an unnecessary cover need not be removed, thereby improving workability of the inspection.

The housing may further comprises an outer wall forming an exterior of the engine generator, an inner wall surrounding the engine room and the muffler room, wherein the exterior of the engine generator has a double wall structure formed by the outer and inner walls. Thereby, the engine is surrounded by the housing having the double wall structure, so that the improvement of sound insulation performance can be accomplished. In particular, the portion where the side plate is disposed results in a triple walls structure, thereby obtaining more sound insulation performance.

The housing may be formed by a blow forming of a synthetic resin. Hereby, the hollow double wall structure can be easily formed, so that heat resistance is improved.

In addition, the hollow space of the double wall structure may have foam material filled into, hereby further improving sound insulation performance thereof.

The above objects and features of the present invention will become better understood from the following description with reference to the accompanying drawings.

DETAILED DESCRIPTION OF THE PREFERRED EMBODIMENT

Figure 1:
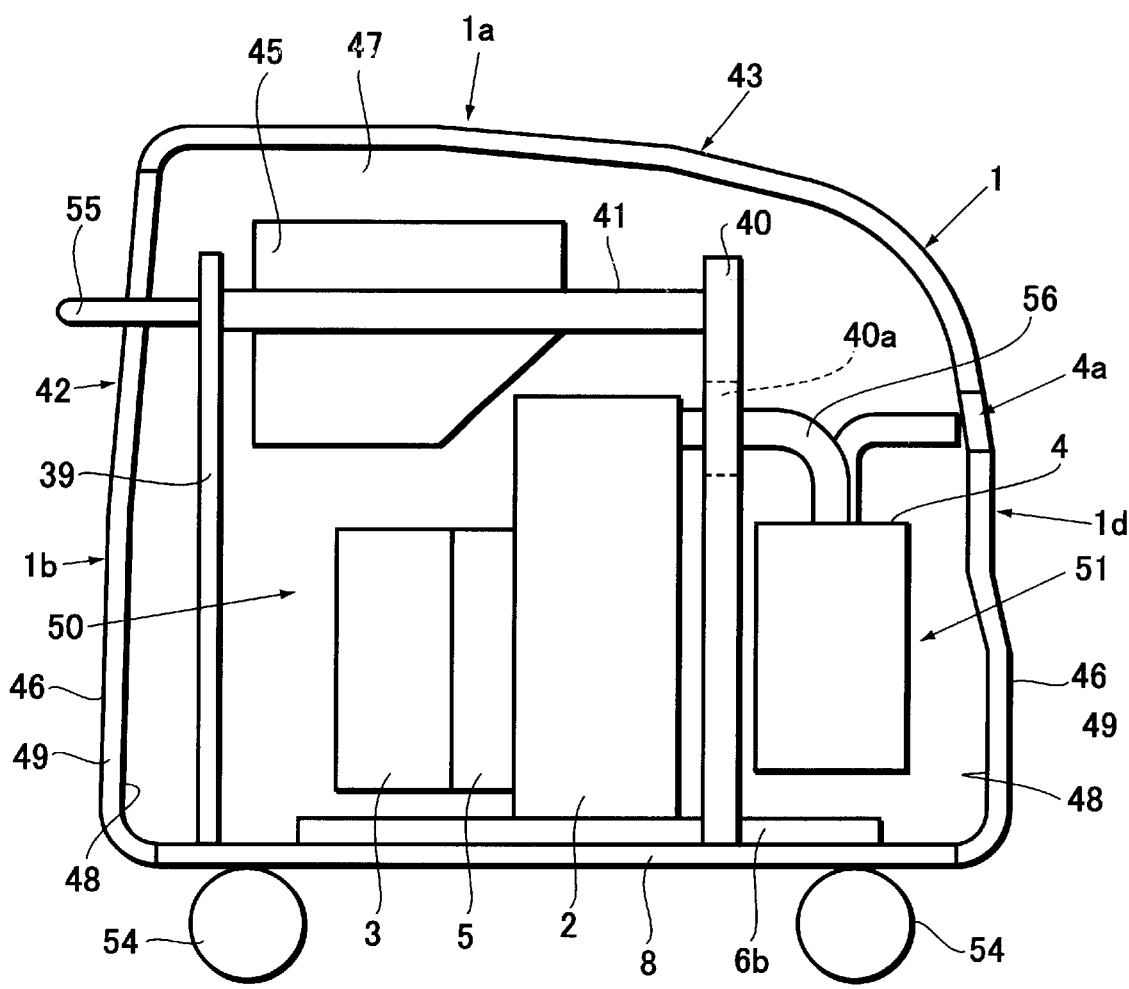
FIG. 1 is an explanatory view schematically showing an inner structure of an engine generator according to an embodiment of the present invention.
Figure 2:
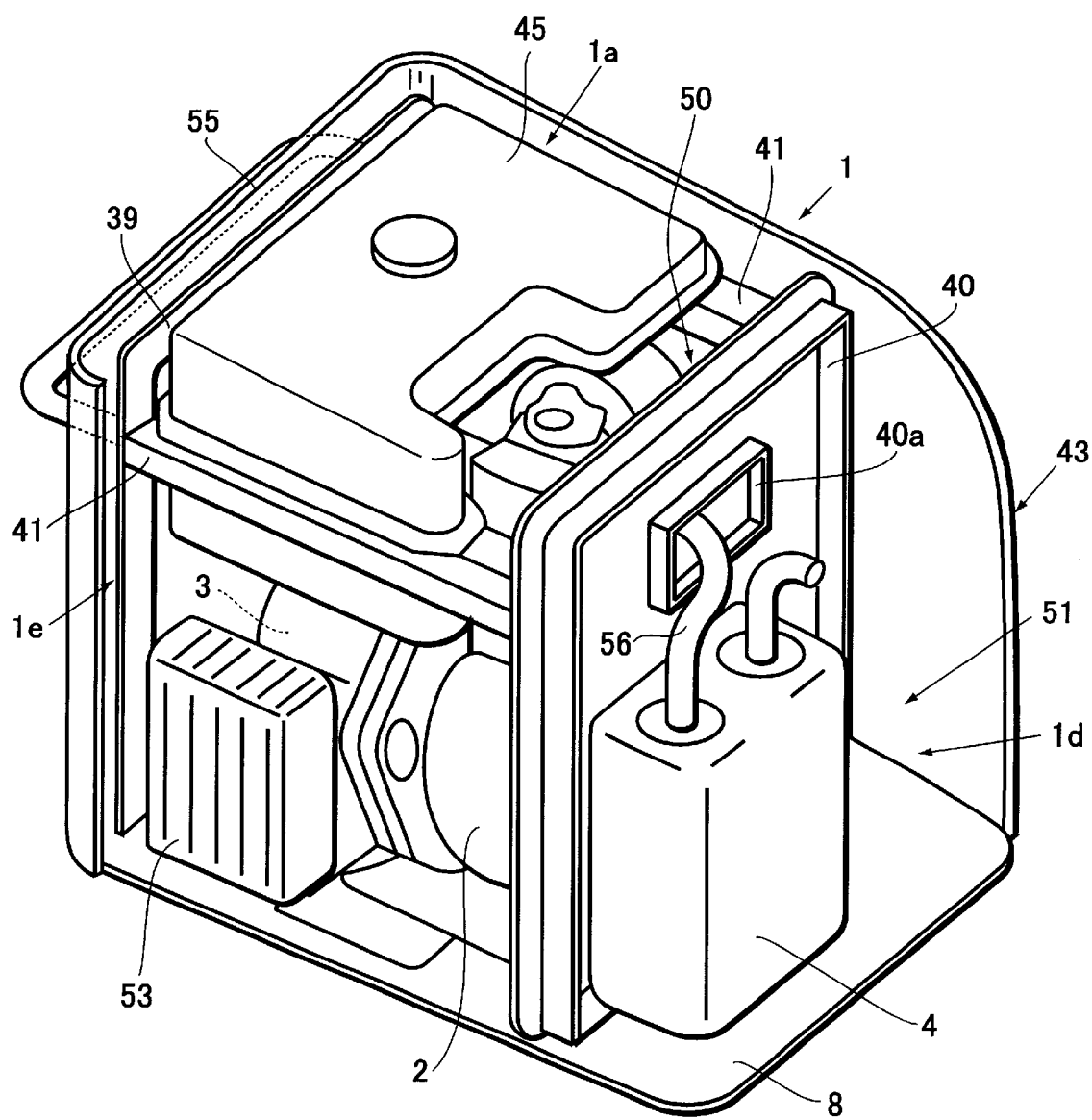
FIG. 2 is a perspective view showing the inner structure of the engine generator as shown in FIG. 1 seen from a front oblique upper side thereof.

Hereinafter, an embodiment of the present invention will be described with reference to the drawings.

An engine generator according to the present embodiment is an electric power generating device of a type where a generator is driven by an engine. The engine generator has a structure that an engine 2, a generator 3, a muffler 4, and a cooling fan 5 are disposed on a base 8, and also they are included within a housing 1 made of synthetic resin. The engine generator has the base 8, a side plate 39, a partition plate 40 and a tank bracket (beam member) 41 within the housing 1, so that an inner structure of the housing can become sturdy and rigid, and be divided into two rooms by the partition plate 40. Also, the engine 2 and the muffler 4 are arranged in the different room each other. In addition, the housing 1 is formed with a double wall structure so as to improve a sound insulation performance. Thus, it can be accomplished to lower the noise caused by the device.

The housing 1 is made of a synthetic resin with high heat resistance such as, for example, a polypropylene, which is mounted above the base 8. The inside of the housing 1 includes the engine 2 and the muffler 4 becoming hot. Therefore, as it is necessary to further improve the heat resistance, the housing 1 may be made by blow forming. However, a material and a manufacturing method according to the present invention are not limited to the above mentioned means.

Figure 4:
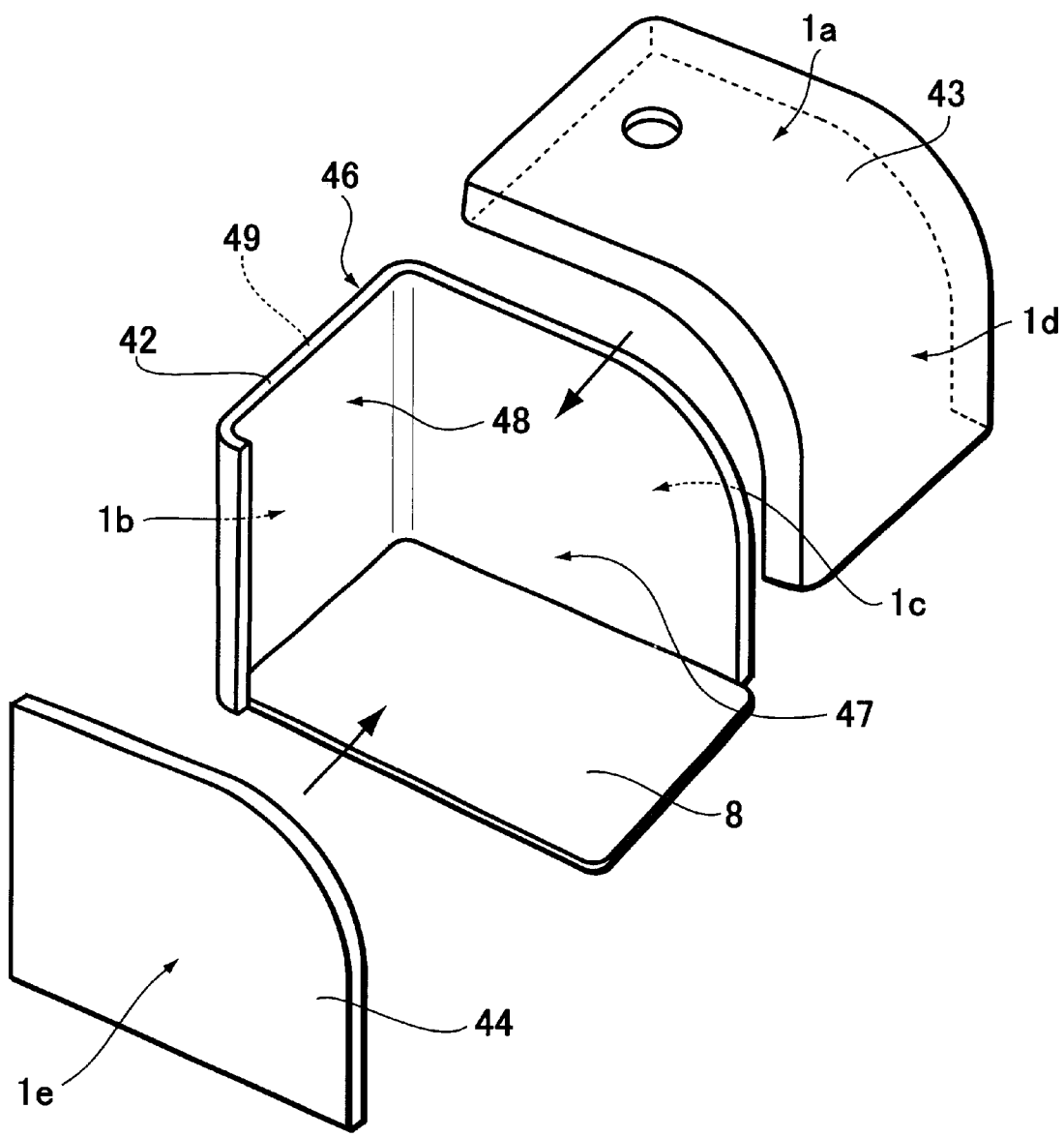
FIG. 4 is an explanatory view showing a structure of a housing in the engine generator as shown in FIG. 1.

As shown in FIG. 4, the housing 1 is constructed by three parts, namely a side cover 42, a main cover 43, and a door cover 44. These covers 42–44 form an upper wall 1a and side walls 1b–1e of the engine generator. The whole device results in a substantially box-like shape of six bodies.

Here, the side cover 42 is integrally formed with the base 8 and the side walls 1b, 1c adjacent to each other of the all four side walls 1b–1e. This side cover 42 including the base 8 forms three surfaces of the engine generator, namely a basic outer face structure thereof. The both main cover 43 and door cover 44 are attached with the side cover 42 including the base 8, thereby completely forming the whole outer body of the engine generator. Incidentally, a connection between the side cover 42 and base 8 may be carried out by a connecting member such as a screw, or by insertion forming of the base 8. In addition, a bottom wall of the housing 1 may be formed on a side of a lower surface of the base 8, and thereon the base 8 may be mounted. Furthermore, as the base 8 may be substituted with the bottom wall of the housing 8, the base 8 may be omitted.

The main cover 43 is formed by integrally constructing the upper wall 1a with the side wall 1d of the side walls. This main cover 43 is detachably attached upon the side cover 42. While the main cover 43 is always fixed therewith in a normal use, it is removed when the inside of the device is inspected and/or repaired like an overhaul work.

Figure 5:
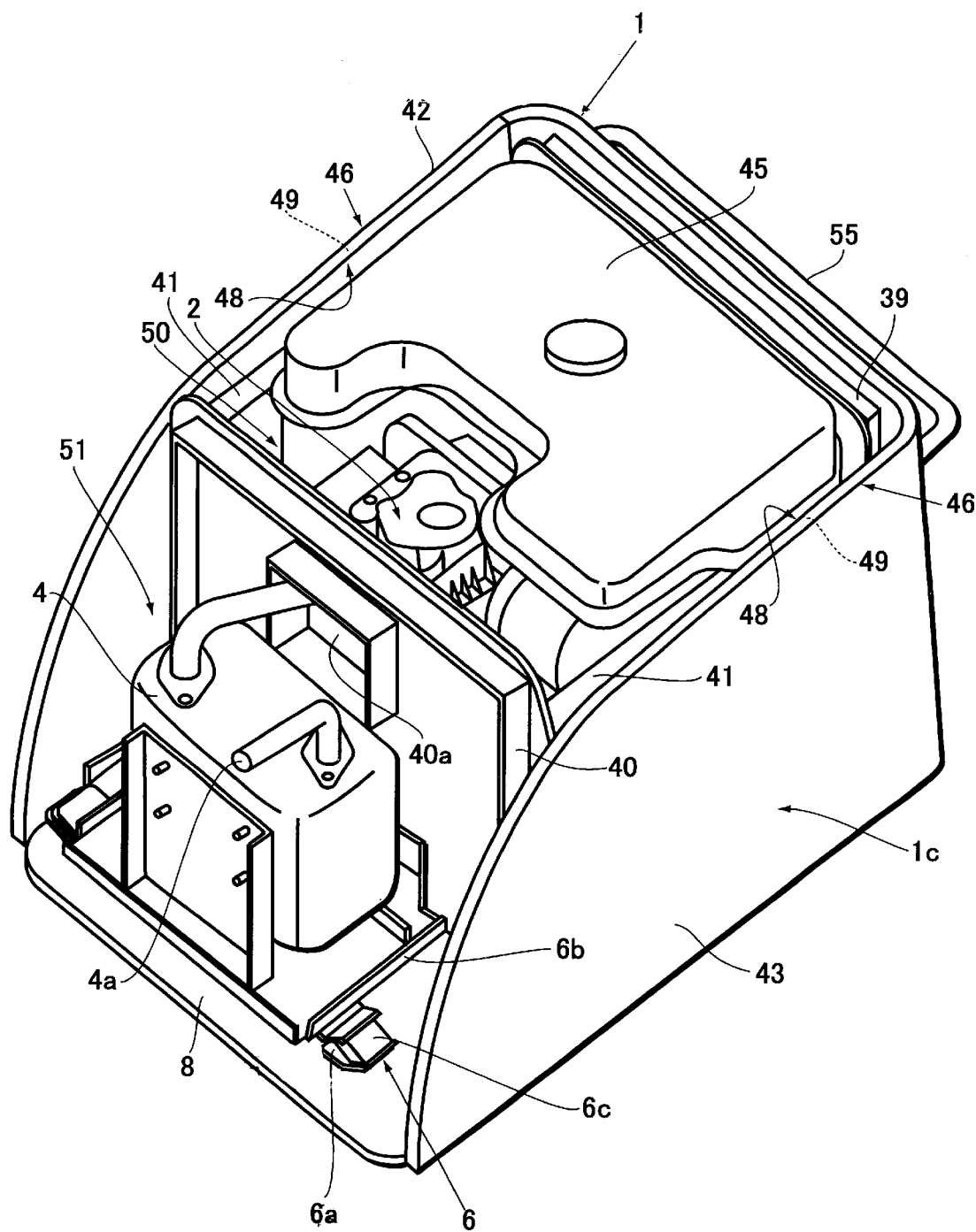
FIG. 5 is an perspective view showing the engine generator without a main cover as shown in FIG. 1.
Figure 6:
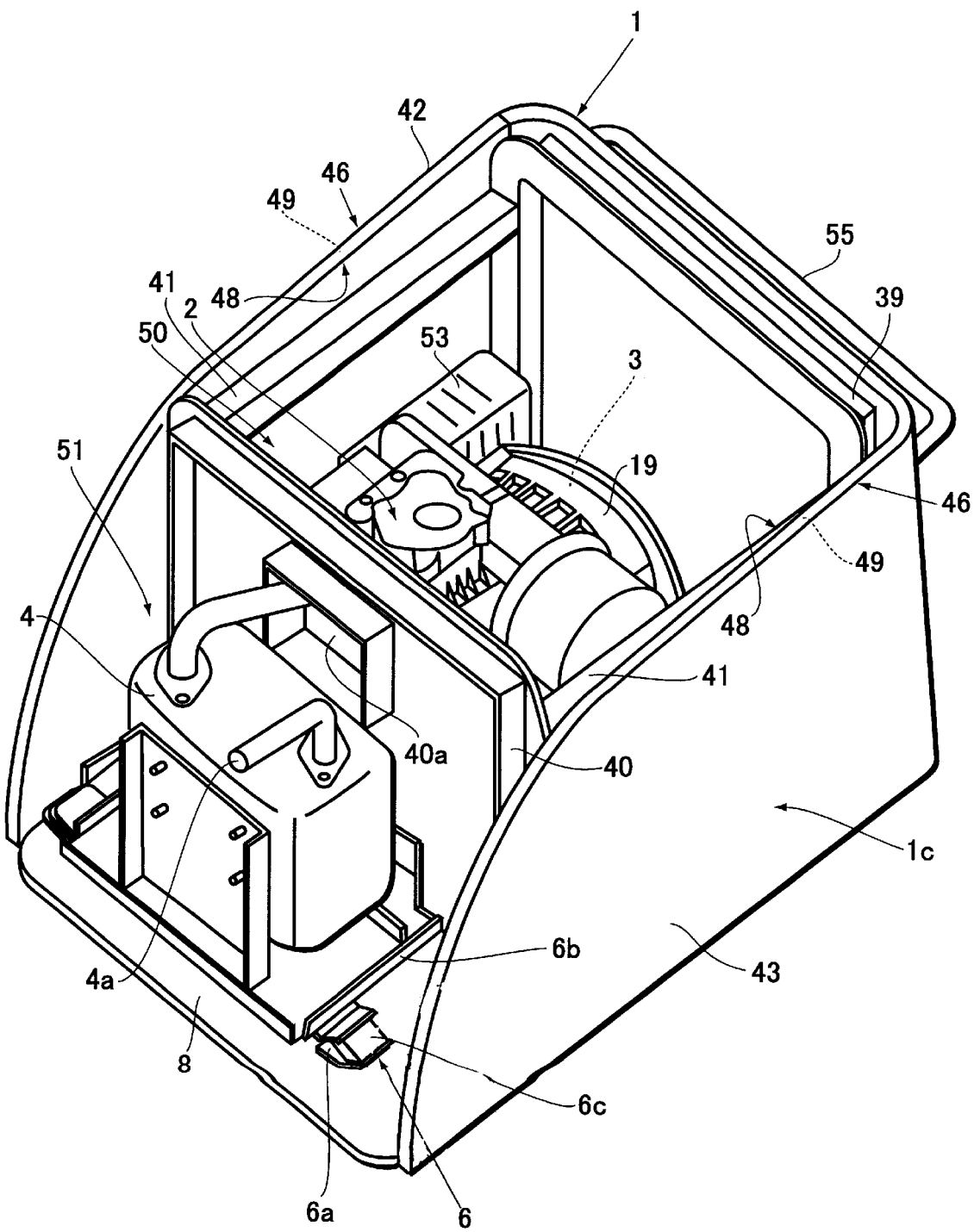
FIG. 6 is an perspective view showing the engine generator without as a fuel tank as shown in FIG. 5.

As shown in FIG. 5, when the main cover 43 is removed, a fuel tank 45, a top portion of the engine 2, and the muffler 4 are exposed. Under this situation, the maintenance work of the engine 2 and the muffler 4 can be carried out. In addition, as shown in FIG. 6, if the fuel tank 45 is further removed, the whole of engine 2 and generator 3 and the other members are exposed, so that the maintenance work of the engine 2 and the generator 3 can be easily carried out.

The door cover 44 formed by one remained surface 1e of the side walls 1b–1e. As mentioned above, the side cover 42 is removed when carrying out an overhaul work, while the door cover 44 is removable for a daily inspection. Therefore, the door cover 44 is formed so as to be easily detachable with the side cover 42 and the main cover 43. Although FIGS. 5 and 6 show the engine generator attached with the door cover 44, of course, the overhaul work may be carried out through removing the door cover 44 also.

In such a way, the housing 1 of the engine generator is constructed by three parts having each different function. A purpose of each cover 42–44 is not only to cover each surface of six bodies, but also to allow the daily inspection and overhaul work thereof to be easily carried out. That is to say, it is sufficient for the maintenance work to remove the door cover 44 at a stage of the daily inspection, and the main cover 43 at a stage of the overhaul work. Consequently, extra components can be eliminated, so that component cost and the number of manufacturing steps can be reduced. Furthermore, it is sufficient to remove just a cover needed for the inspection and repair when inspecting it also, thereby improving the workability of inspection.

These covers 42–44 are formed with a hollow structure by blow forming. That is, these covers 42–44 are constructed by an outer wall 46 and an inner wall 48, respectively. The outer wall 46 forms an exterior of the engine generator, and a designed outside appearance. The inner wall 48 forms a device including room 47 for including the engine 2 and the generator 3. There is formed the hollow space 49 between the outer wall 46 and the inner wall 48, which results in a hollow double wall structure formed by the covers 42–44.

Thus, since the covers 42–44 enclosing the engine 2 has a hollow space 49 between the outer and inner walls, which is an air layer, the improvement of sound insulation performance is obtained. Incidentally, it is also possible to obtain a further improvement of sound insulation performance through inserting a foaming material such as urethane into the hollow space.

As shown in FIGS. 1–4, the housing 1 is provided with the side plate 39 and the partition plate 40 on the base 8, and the tank bracket 41 is extended across between the side plate 39 and the partition plate 40. The device including room 47 within the housing 1 is divided into two rooms of the engine room 50 and the muffler room 51 by the partition plate 40.

The base 8 is a flat plate made from metal, on which a bracket 6b for supporting the engine 2, a battery 52 and an inverter unit 53 are disposed. Furthermore, on the underside of the base 8, casters are attached.

The side plate 39 is a wall member made from a sheet metal, and extends along a rear end of the housing 1, a lower end of which is fixed onto the base 8. An upper portion of the slide plate 8 has a handle 55 extending backward from a rear end of the housing 1.

The partition plate 40 is also a wall member made from a sheet metal as well as the side plate 39, and stands between the engine 2 and the muffler 4 within the housing 1. A lower end of the partition plate 40 is fixed onto the base 8 as well as the side plate 39. The partition plate 40 is provided with an opening 40a at a central upper portion in the width direction, through which an exhaust pipe 56 is passed for connecting the engine 2 with the muffler 4.

An upper portion of the side plate 39 and the partition plate 40 is further provided with a pair of tank brackets 41 which are formed by an angle steel made from metal, and connect the both upper ends of the side plate 39 and the partition plate 40 at the opposite ends, respectively, and the fuel tank 45 is mounted thereon.

As mentioned above, the housing 1 of the engine generator according to the present invention is divided into two rooms, namely the engine room 50 and the muffler room 51 by the partition plate 40. In more details, at the rear side of the partition plate 40 is formed the engine room 50 which is surrounded by the base 8, the side plate 39, the partition plate 40 and the tank bracket 41. Also, at the front side of the partition plate 40 is formed the muffler room 50 which is surrounded by the base 8, the partition plate 40, the side cover 42 and the main cover 43.

Here, at the rear side of the engine room 50, a side cover 42 with double walls and the side plate 39 are disposed. Hereby, triple walls comprising the outer wall 46, the inner wall 48, and the side plate 39 are formed at the rear side of the housing 1. Therefore, the sound insulation performance of the rear side of the housing 1 is improved, thereby the engine generator becomes more calm. Incidentally, a side face thereof without the side plate 39 also is formed by the side cover 42 with the double walls, the sound insulation performance of which also is improved, if compared with that having a side cover formed from a single plate.

Furthermore, with regard to the front side of the housing 1, the partition plate 40 and the main cover 43 forms a triple walls structure, wherein the sound insulation performance is improved. In addition, the engine generator according to the present invention discloses the engine 2 at a substantially central position of the whole device so as to evenly insulate the noise of engine. Therefore, not only the working sound itself but also unevenness of the working sound in the direction of the arrangement of the device is reduced, so that an advantageous engine generator can be supplied.

Furthermore, as shown in FIG. 1, the engine room 50 is constructed by cube type frames comprising the base 8, the side plate 39, the partition plate 40 and the tank bracket 41 when viewed from a side direction thereof. In the other words, the engine room 50 has a higher sound insulation performance caused by the side plate 39 and the partition plate 40, while it is constructed in a tough structure owing to the disposition of the tank bracket 41. Thus, even if the housing 1 is made of a synthetic resin, the mounting strength of the engine generator is ensured, so that not only the sound insulation performance but also vibration isolation performance and durability thereof are improved.

Furthermore, the engine 2 is a all-purpose diesel engine, and a rotation of the crankshaft (not shown) thereof drives the generator 3 to generate an electric power. The generator 3 is a multipolar generator of an outer rotor type, which is arranged at the left side of the engine 2 in FIG. 1. On the other hand, exhaust gas discharged from the engine 2 is transmitted to the muffler 4 which is arranged at the right side of the engine 2 in FIG. 1, and then reduction of exhaust sound is conducted therein, and lastly is discharged from a exhaust port 4a to the outside of the device.

Figure 3:
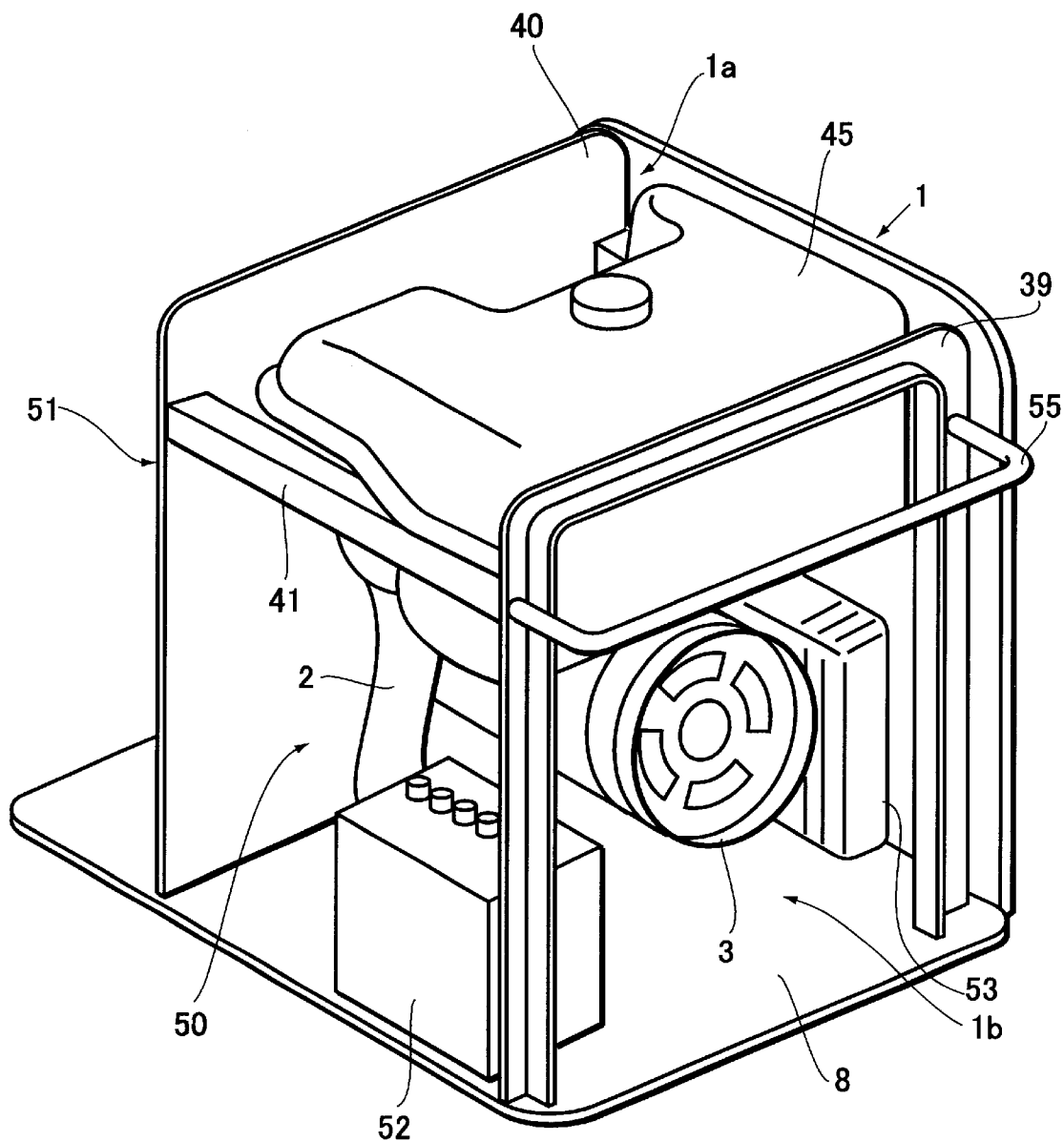
FIG. 3 is a perspective view showing the inner structure of the engine generator as shown in FIG. 1.

Next, the engine 2 is supported on the base 8 by a vibration isolation supporting portion 6 as shown in FIG. 3. The vibration isolation supporting portion 6 is formed by a vibration isolation supporting plate 6a, a bracket 6b mounted on the base 8, and a vibration isolation member 6c. The vibration isolation supporting plate 6a is attached to a lower surface of the both side ends of an oil pan (not shown) provided in the engine 2, and the vibration isolation member 6c is arranged between the vibration isolation supporting plate 6a and the bracket 6b. The vibration isolation member 6c is made of rubber, synthetic resin, or the like, and thus prevents a vibration of the engine 2 during the operation from being transmitted to the base 8. In the engine generator according to the present invention, this vibration isolation supporting member 6 supports the engine 2, so that an attenuation of the engine vibration can be accomplished, thereby leading the calmness of the device.

Moreover, although the above description discloses the example employing the all-purpose diesel engine as an engine, of course, a gasoline engine may be used in place of it.

While there has been described what are at present considered to be preferred embodiments of the present invention, it will be clearly understood that various modifications may be made thereto, and it is intended that the appended claims cover all such modifications as fall within the true spirit and scope of the invention.

What is claimed is:

1. An engine generator having an engine, a generator driven by the engine, a muffler disposed at an exhaust side of the engine on a base, and a housing for including the engine, the generator, and the muffler, comprising:

a partition plate vertically mounted between the engine and the muffler within the housing;

a side plate vertically mounted along an end of the housing;

a beam mounted across between an upper portion of the side plate and the partition plate;

an engine room for including the engine and the generator, said room being surrounded by the base, the partition plate, the side plate, and the beam; and a muffler room surrounded by the base, the partition plate, and the housing for including the muffler.

2. The engine generator according to claim 1, further comprising:

an outer wall for covering an exterior of the engine generator; and an inner wall for surrounding the engine room and the muffler room, wherein the exterior of the engine generator has a double wall structure formed by the outer wall and the inner wall.

3. An engine generator having an engine and a generator driven by the engine on a base, and a housing including an upper surface and four side walls for including the engine and the generator, the housing comprising:

a side cover for integrally forming the base with two adjacent surfaces of the four side walls;

a main cover for integrally forming the upper surface with another surface of the four side walls; and a door cover formed by one remaining surface of all the side walls.

4. The engine generator according to claim 3, wherein:
the main cover is used for an overhaul work.

5. The engine generator according to claim 3, wherein:
the door cover is used as an access door for a daily inspection.

6. The engine generator according to claim 3, further comprising:

an outer wall for forming an exterior of the engine generator;

an inner wall for enclosing the engine and a muffler connected with the engine; and wherein the exterior of the engine generator has a double wall structure formed by the outer wall and the inner wall.

7. The engine generator according to claim 6, wherein:
the housing is formed by a blow forming of a synthetic resin material.

8. The engine generator according to claim 6, further comprising:

foaming material filled with in the double wall structure.

* * * * *